(12) United States Patent
Nichols

(10) Patent No.: US 7,310,137 B2
(45) Date of Patent: Dec. 18, 2007

(54) SELF SURVEYING LASER TRANSMITTER

(75) Inventor: Mark E. Nichols, Christchurch (NZ)

(73) Assignee: Trimble Navigation, Ltd, Sunnyvale, CA (US)

( * ) Notice: Subject to any disclaimer, the term of this patent is extended or adjusted under 35 U.S.C. 154(b) by 189 days.

(21) Appl. No.: 11/010,224

(22) Filed: Dec. 11, 2004

(65) Prior Publication Data

US 2006/0127096 A1 Jun. 15, 2006

(51) Int. Cl.
*G01B 11/26* (2006.01)
(52) U.S. Cl. .............................. 356/139.01; 356/139.1
(58) Field of Classification Search ............... 356/3.12, 356/139.01
See application file for complete search history.

(56) References Cited

U.S. PATENT DOCUMENTS 5,949,371 A * 9/1999 Nichols ................. 342/357.01
6,433,866 B1 * 8/2002 Nichols ................... 356/141.1

* cited by examiner

*Primary Examiner*—Thomas H. Tarcza
*Assistant Examiner*—Luke Ratcliffe
(74) *Attorney, Agent, or Firm*—Boris G. Tankhilevich

(57) ABSTRACT

A self-surveying laser transmitter comprising a laser transmitter configured to generate at least one rotating laser beam and a radio positioning system integrated with the laser transmitter. The radio positioning system is configured to obtain the precise coordinate measurements of the laser transmitter, by utilizing the differential corrections transmitted from the Base Station by using the wireless communication link.

3 Claims, 2 Drawing Sheets

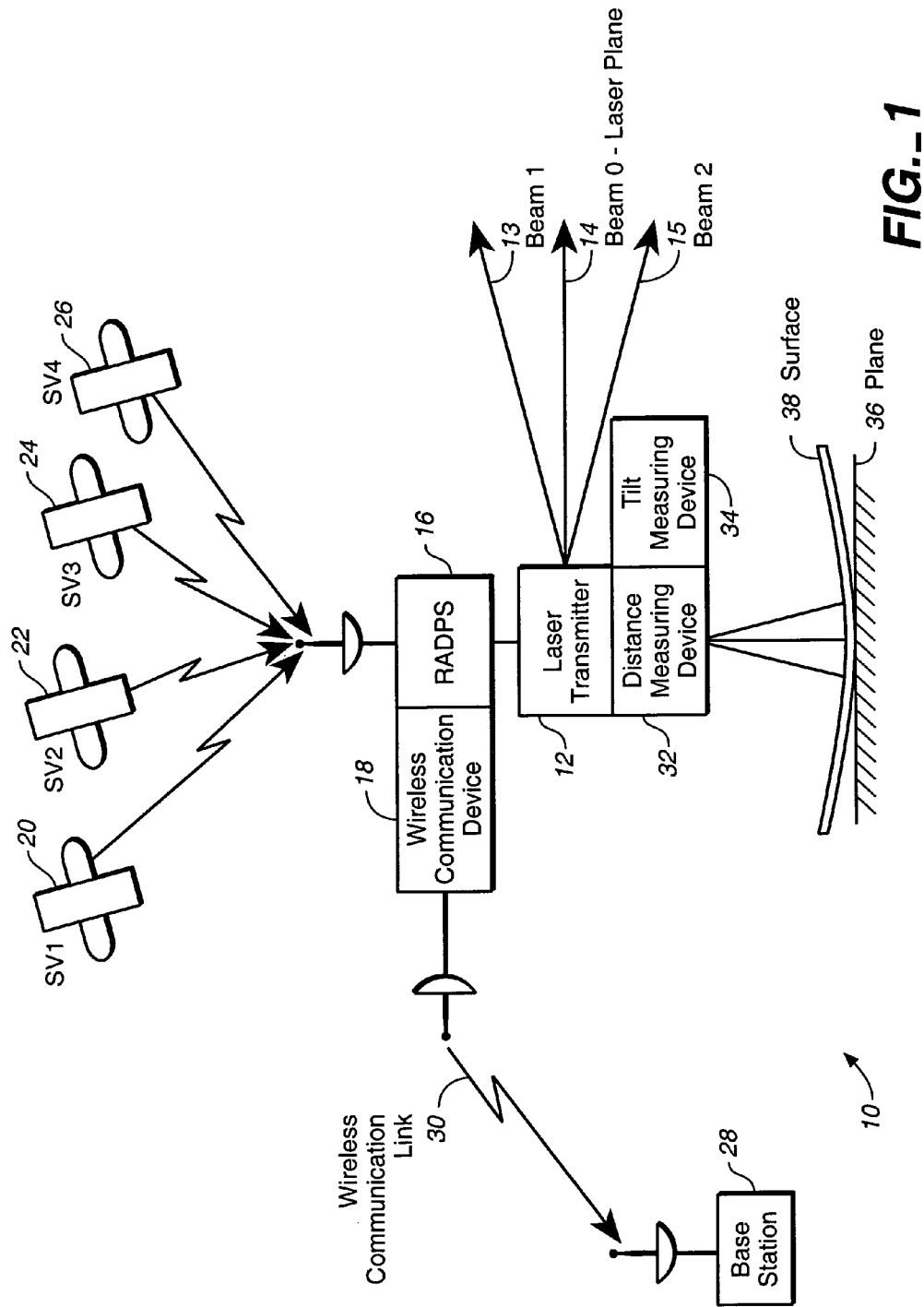
FIG._1

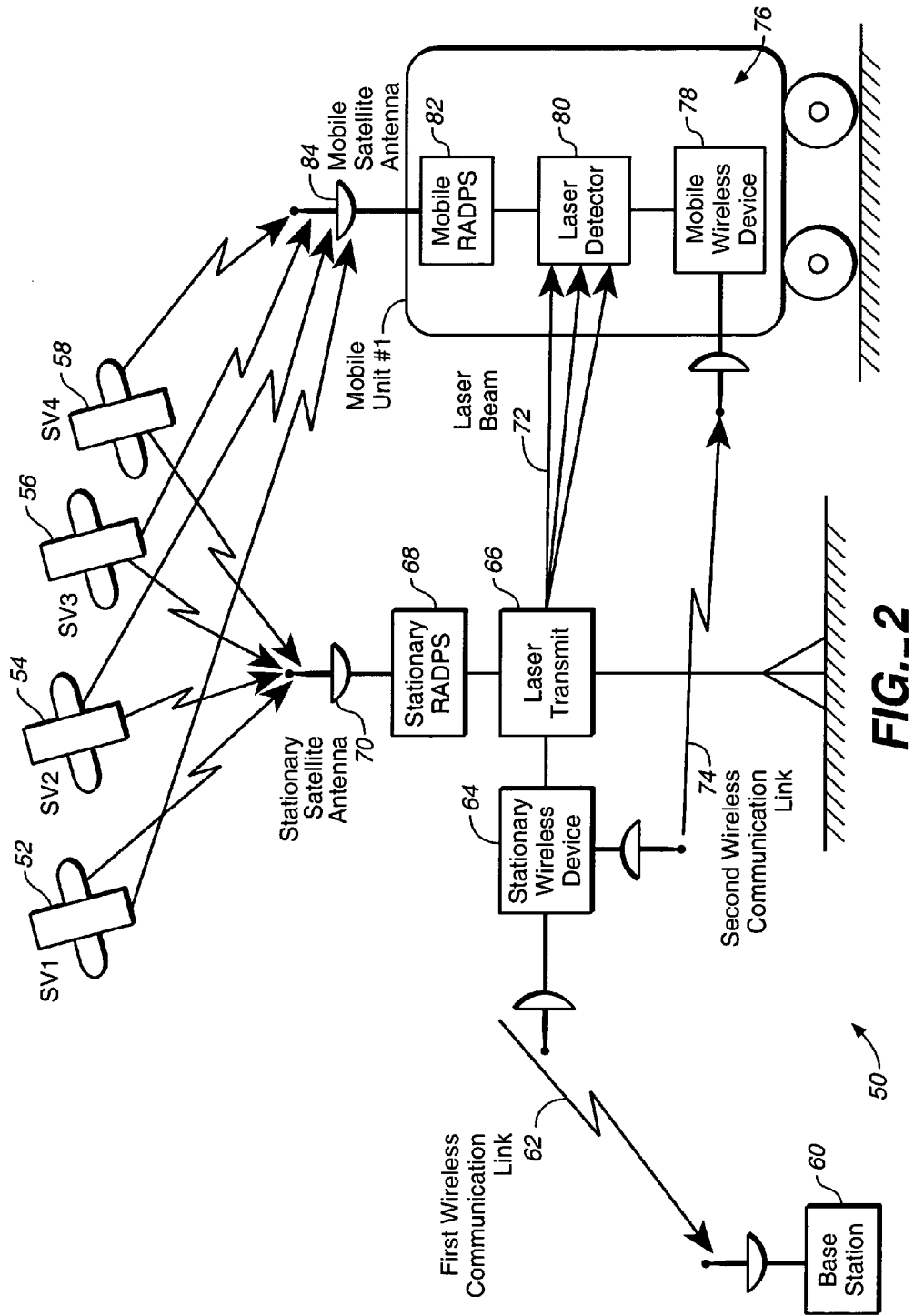
FIG._2

SELF SURVEYING LASER TRANSMITTER

BACKGROUND OF THE INVENTION

1. Field of the Invention

The current invention relates to position tracking and machine control systems, and, more specifically, to a combination of laser systems and global navigation satellite systems configured to include self surveying capabilities in addition to having tracking and machine control capabilities.

2. Discussion of the Prior Art

The prior art integrated laser and satellite positioning system can provide a plurality of mobile units with a laser plane data determined with a millimeter relative accuracy. The prior art integrated laser and differential satellite positioning system can also generate and transmit the differential correctional data to a plurality of mobile units. Each mobile unit equipped with a mobile satellite positioning system receiver can use the differential correction data and the high precision laser plane data to improve its position determination capabilities.

However, the prior art integrated laser and satellite positioning system has to be placed in a location with known coordinates in order to utilize its capabilities.

SUMMARY OF THE INVENTION

The present invention addresses this problem by disclosing a self-surveying integrated laser and a radio positioning system.

More specifically, one aspect of the present invention is directed to a self-surveying laser transmitter.

In one embodiment of the present invention, the self-surveying laser transmitter comprises: a laser transmitter configured to generate at least one rotating laser beam, a positioning system integrated with the laser transmitter, and a wireless communication device. In this embodiment, the positioning system is configured to obtain the coordinate measurements of the laser transmitter.

In one embodiment of the present invention, the laser transmitter further comprises a plane laser transmitter configured to generate a reference laser beam providing a high accuracy vertical coordinate. In another embodiment of the present invention, the laser transmitter further comprises a fan laser transmitter configured to generate at least one rotating fan-shaped laser beam.

In one embodiment of the present invention, the positioning system further comprises a stationary radio positioning system (RADPS) receiver integrated with the laser transmitter. The stationary radio positioning system (RADPS) receiver is selected from the group consisting of: {a GPS receiver; a GLONASS receiver; a combined GPS/GLONASS receiver; a GALILEO receiver; a Global Navigational Satellite System (GNSS) receiver; and a pseudolite receiver}.

In one embodiment of the present invention, the stationary RADPS receiver includes a stationary radio antenna, whereas the distance between a phase center of the stationary radio antenna and the laser transmitter is known and fixed.

In one embodiment, the apparatus of the present invention further comprises a wireless communication link configured to connect the wireless communication device to a source of differential correction data. The wireless communication link is selected from the group consisting of: {a cellular link; a radio; a private radio band; a SiteNet 900 private radio network; a wireless Internet; and a satellite wireless communication link}. The source of differential correction data is selected from the group consisting of: {a Base Station, an RTK Base Station; a Virtual Base Station (VBS); and a pseudolite transmitter}.

In one embodiment of the present invention, the wireless communication device is configured to receive a set of differential corrections data from an optimum source of differential correction data using an optimum wireless communication link, and the stationary radio positioning system (RADPS) receiver is configured to utilize the set of differential corrections data to obtain the precise coordinate measurements of the laser transmitter.

In one embodiment, the apparatus of the present invention further comprises a distance measuring device integrated with the RADPS receiver. In this embodiment, the distance measuring device is configured to measure the distance between the phase center of the stationary radio antenna and a known point or reference plane over which the self-surveying laser transmitter is positioned in order to determine the position coordinates of the laser transmitter in relation to the known point or reference plane.

In one embodiment, the apparatus of the present invention further comprises a tilt angle measurement device integrated with the RADPS receiver. In this embodiment, the tilt measurement device is configured to perform tilt coordinates measurements of the phase center of the stationary radio antenna in relation to the known reference surface over which the self-surveying laser transmitter is positioned in order to determine the position coordinates of the laser transmitter in relation to the known reference surface.

In one embodiment, the apparatus of the present invention further comprises an orientation measurement device integrated with the RADPS receiver. In this embodiment, the orientation measurement device is configured to perform orientation coordinate measurements of the phase center of the stationary radio antenna in relation to the known reference surface over which the self-surveying laser transmitter is positioned in order to determine an orientation of the laser transmitter in relation to the known reference surface.

In one embodiment of the present invention, the wireless communication device is configured to broadcast the position coordinates of the laser transmitter by using a wireless communication link. In another embodiment of the present invention, the wireless communication device is configured to respond to specific requests from a mobile equipment transmitted over the wireless communication link.

Another aspect of the present invention is directed to a self-surveying integrated laser and radio positioning guidance system (SSI_LARADPS).

In one embodiment of the present invention, the self-surveying integrated laser and radio positioning guidance system (SSI_LARADPS) comprises: a laser transmitter generating a laser beam; a stationary radio positioning system (RADPS) receiver integrated with the laser transmitter; a first wireless communication link; a stationary wireless communication device configured to receive a set of differential corrections data by using the first wireless communication link; at least one mobile unit including a laser detector and a mobile radio positioning system (RADPS) receiver; and at least one second wireless communication link between SSI_LARADPS system and the mobile unit.

In one embodiment of the present invention, the stationary RADPS receiver includes a stationary radio antenna, whereas the distance between the phase center of the stationary antenna and the laser beam is known and fixed. In this embodiment of the present invention, the stationary radio positioning system (RADPS) receiver is configured to utilize the set of differential corrections data to obtain precise coordinate measurements of the laser transmitter. In this embodiment of the present invention, at least one second wireless communication link is used to substantially continuously transmit to at least one mobile unit the precise coordinate measurements of the laser transmitter and the set of differential corrections obtained by the stationary RADPS receiver, wherein at least one mobile RADPS receiver utilizes the differential corrections to obtain the precise coordinate measurements of the mobile unit.

In one embodiment of the present invention, the laser transmitter further comprises a plane laser transmitter configured to generate a reference laser beam providing a high accuracy vertical coordinate. In this embodiment of the present invention, at least one mobile RADPS receiver utilizes the differential corrections and the high accuracy vertical coordinate to obtain the precise coordinate measurements of the mobile unit.

In another embodiment of the present invention, the laser transmitter generates a rotating laser beam providing a high accuracy dual slope reference laser plane. In this embodiment of the present invention, the stationary radio positioning system (RADPS) receiver further comprises a vector differential radio positioning system (VRADPS) receiver integrated with the laser transmitter.

In one embodiment of the present invention, the vector differential VRADPS receiver includes a master stationary radio antenna and a plurality of slave stationary radio antennas, and the distance between a phase center of the master stationary radio antenna and the reference laser plane is known and fixed. The vector differential VRADPS receiver is capable of determining the attitude of the dual slope reference laser plane.

In one embodiment of the present invention, at least one second wireless communication link is used to transmit to at least one mobile unit an elevation, a slope and angles of orientation of the laser plane at the location of the laser transmitter and differential corrections obtained by the vector differential RADPS receiver. In this embodiment of the present invention, at least one mobile RADPS receiver utilizes a set of data including a set of positional data obtained by the mobile RADPS receiver, the elevation, the slope and the angles of orientation of the laser plane at the laser transmitter location, and the differential corrections data in order to obtain the precise coordinate measurements of at least one mobile unit.

In one embodiment of the present invention, the laser transmitter further comprises a fan laser transmitter configured to generate at least one rotating fan-shaped laser beam. In this embodiment of the present invention, at least one mobile RADPS receiver utilizes a set of data including a set of positional data obtained by the mobile RADPS receiver, a set of positional data of the laser transmitter, and the differential corrections data in order to obtain the precise coordinate measurements of at least one mobile unit.

In one embodiment of the present invention, at least one second wireless communication link further comprises a modulation system adapted to modulate the laser beam with the differential correction data and with the laser beam data.

In one embodiment of the present invention, at least one mobile unit further includes a mobile wireless communication device configured to receive and transmit data; and a computer configured to utilize the laser beam data and the differential correction data in order to precisely operate the mobile unit.

One more aspect of the present invention is directed to a method of self-surveying of any object, including a laser transmitter.

More specifically, in one embodiment, the method of the present invention comprises the following steps: (A) providing a stationary radio positioning system (RADPS) receiver integrated with the laser transmitter, whereas the stationary RADPS receiver includes a stationary radio antenna, and wherein the distance between a phase center of the stationary radio antenna and the laser transmitter is known and fixed; (B) providing a wireless communication device configured to receive a set of differential corrections data; and (C) obtaining precise coordinate measurements of the laser transmitter by using the stationary radio positioning system (RADPS) receiver configured to utilize the set of differential corrections data.

In one embodiment of the present invention, the step (A) further comprises the step (A1) of selecting the stationary radio positioning system (RADPS) receiver from the group consisting of: {a GPS receiver; a GLONASS receiver; a combined GPS/GLONASS receiver; a GALILEO receiver; a Global Navigational Satellite System (GNSS) receiver; and a pseudolite receiver}.

In one embodiment of the present invention, the step (A) further comprises the step (A2) of generating a reference laser beam providing a high accuracy vertical coordinate by using a plane laser transmitter. In another embodiment of the present invention, the step (A) further comprises the step (A3) of generating at least one rotating fan-shaped laser beam by using a fan laser transmitter.

In one embodiment of the present invention, the step (B) further comprises the step (B1) of broadcasting the position coordinates of the laser transmitter by using the wireless communication device. In another embodiment of the present invention, the step (B) further comprises the step (B2) of responding to specific requests from a mobile equipment by using the wireless communication device.

In one embodiment, the method of the present invention further comprises the step of providing a wireless communication link configured to connect the wireless communication device to a source of differential correction data. In one embodiment of the present invention, the optimum source of differential correction data is selected from the group consisting of: {a Base Station, an RTK Base Station; a Virtual Base Station (VBS); and a pseudolite transmitter}. In one embodiment of the present invention, the optimum wireless communication link is selected from the group consisting of: {a cellular link; a radio; a private radio band; a SiteNet 900 private radio network; a wireless Internet; and a satellite wireless communication link}.

Yet, one more aspect of the present invention is directed to a method of tracking a mobile unit utilizing a self-surveying integrated laser and radio positioning guidance system (SSI_LARADPS). The SSI_LARADPS system comprises: a laser transmitter; a stationary radio positioning system (RADPS) receiver integrated with the laser transmitter, the stationary RADPS receiver having a stationary radio antenna, wherein the distance between the phase center of the stationary antenna and the laser beam is known and fixed; a first wireless communication link; a stationary wireless communication device integrated with the laser transmitter; a mobile unit including a laser detector, a mobile radio positioning system (RADPS) receiver, and a mobile wireless communication device; and a second wireless communication link between the SSI_LARADPS system and the mobile unit.

In one embodiment, the method of the present invention comprises the following steps: (A) generating a laser beam using the laser transmitter; (B) receiving a set of differential corrections data by using the first wireless communication link and the stationary wireless communication device; (C) obtaining precise coordinate measurements of the laser transmitter by using the stationary radio positioning system (RADPS) receiver configured to utilize the set of differential corrections data; (D) using the stationary wireless communication device and the second wireless communication link to substantially continuously transmit to the mobile unit the precise coordinate measurements of the laser transmitter and the set of differential corrections obtained by the stationary RADPS receiver; (E) obtaining the precise coordinate measurements of the mobile unit by using the mobile RADPS receiver configured to utilize the differential corrections; and (F) sending back to the laser transmitter the precise coordinate measurements of the mobile by using the second wireless communication link and the mobile wireless communication device.

In one embodiment of the present invention, the step (A) of generating the laser beam using the laser transmitter further comprises the step (A1) of generating a reference laser beam providing a high accuracy vertical coordinate by using a plane laser transmitter. In another embodiment of the present invention, the step (A) of generating the laser beam using the laser transmitter further comprises the step (A2) of generating a rotating laser beam, wherein the rotating laser beam provides a high accuracy dual slope reference laser plane. In one embodiment of the present invention, the step (A) of generating the laser beam using the laser transmitter further comprises the step (A3) of generating at least one rotating fan-shaped laser beam by using a fan laser transmitter.

In one embodiment, wherein the SSI_LARADPS system further comprises a display, the method of the present invention further comprises the step (G) of displaying the precise coordinate measurements of the mobile unit on the display.

In one embodiment, the method of the present invention further comprises the following steps: (H) substantially continuously updating the precise coordinate measurements of the mobile unit; (I) sending back to the laser transmitter the updated coordinate measurements of the mobile unit by using the second wireless communication link and the mobile wireless communication device; and (K) displaying the updated coordinate measurements of the mobile unit on the display.

One additional aspect of the present invention is directed to a method of tracking a plurality of mobile units utilizing a self-surveying integrated laser and radio positioning guidance system (SSI_LARADPS).

In one embodiment, the method of the present invention comprises the following steps: (A) generating a laser beam using the laser transmitter; (B) receiving a set of differential corrections data by using the first wireless communication link and the stationary wireless communication device; (C) obtaining precise coordinate measurements of the laser transmitter by using the stationary radio positioning system (RADPS) receiver configured to utilize the set of differential corrections data; (D) using the stationary wireless communication device and at least one second wireless communication link to substantially continuously transmit to at least one mobile unit the precise coordinate measurements of the laser transmitter and the set of differential corrections obtained by the stationary RADPS receiver; (E) obtaining the precise coordinate measurements of at least one mobile unit by using the mobile RADPS receiver configured to utilize the differential corrections; (F) sending back to the laser transmitter the precise coordinate measurements of at least one mobile by using at least one second wireless communication link and at least one mobile wireless communication device; and (G) repeating the steps (D-F) for at least one next mobile unit.

In one embodiment, wherein the SSI_LARADPS system further comprises a display, the method of the present invention further comprises the step (H) of displaying the precise coordinate measurements of at least one mobile unit on the display.

In one embodiment, the method of the present invention further comprises the following steps: (I) substantially continuously updating the precise coordinate measurements of at least one mobile unit; (K) sending back to the laser transmitter the updated coordinate measurements of at least one mobile unit by using at least one second wireless communication link and at least one mobile wireless communication device; and (L) displaying the updated coordinate measurements of at least one mobile unit on the display.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts the self-surveying laser transmitter of the present invention comprising: a laser transmitter configured to generate at least one rotating laser beam, a stationary radio positioning system (RADPS) receiver integrated with the laser transmitter, and a wireless communication device.

FIG. 2 illustrates a self-surveying integrated laser and radio positioning guidance system (SSI_LARADPS) of the present invention including: a laser transmitter generating a laser beam; a stationary radio positioning system (RADPS) receiver integrated with the laser transmitter; a first wireless communication link; a stationary wireless communication device configured to receive a set of differential corrections data by using the first wireless communication link; at least one mobile unit including a laser detector and a mobile radio positioning system (RADPS) receiver; and at least one second wireless communication link between SSI_LA-RADPS system and the mobile unit.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

In one embodiment of the present invention, FIG. 1 depicts the self-surveying laser transmitter 10 comprising: a laser transmitter 12 configured to generate at least one rotating laser beam 14, a stationary radio positioning system (RADPS) receiver 16 integrated with the laser transmitter 12, and a wireless communication device 18. In this embodiment, the radio positioning system (RADPS) 16 is configured to obtain the coordinate measurements of the laser transmitter 12.

The stationary radio positioning system (RADPS) receiver 16 integrated with the laser transmitter 12 provides a number of benefits to a potential user comparatively with a system that mechanically combines a laser system and a RADPS receiver system. Indeed, the stationary radio positioning system (RADPS) receiver 16 integrated with the laser transmitter 12 has the reduced cost as opposed to the cost of the combined laser and RADPS system because the integrated system requires only one set of packaging, can utilize a shared computer memory and can use a common power supply. In the integrated system the laser beam and the electrical phase center of the RADPS stationary antenna are separated by a known and fixed distance (not shown), wherein in the mechanically combined system the distance between the laser beam and the electrical phase center of the RADPS stationary antenna is prone to errors because this distance is introduced by an operator of the integrated system.

In one embodiment of the present invention, the laser transmitter further comprises a plane laser transmitter configured to generate a reference laser beam 14 providing a high accuracy vertical coordinate. Similar plane laser transmitter is fully disclosed in the U.S. Pat. No. 6,433,866 "High precision GPS/RTK and laser machine control" assigned to the assignee of the present invention. The U.S. Pat. No. 6,433,866 is incorporated herein in its entirety.

More specifically, according to the '866 patent, the laser transmitter 12 includes a rotating laser system. In a rotating laser system a laser source spins (mechanically, or optically) in the horizontal plane (or Z-plane). The rotating laser emits a laser beam that provides an accurate reference plane with a millimeter accuracy. However, to detect and get benefit of the rotating laser beam, the potential user has to be located within vertical range, and has to be equipped with a laser detector (or a laser receiver) capable of receiving the rotating laser beam. In the mechanical embodiment, the motor physically rotates the laser and accordingly the laser beam. In the optical embodiment, the mirror rotates in such a way that the physically non-rotating laser emits the rotating laser beam.

Trimble Navigation Ltd. manufactures a 3D Laser Station that generates at least one rotating fan-shaped laser beam 13 (and/or 15). The detailed description of such fan laser transmitter is given in the copending patent application Ser. No. 10/890,037 A-1500 "COMBINATION LASER SYSTEM AND GLOBAL NAVIGATION SATELLITE SYSTEM" that is incorporated by reference herein in its entirety. The copending patent application A-1500 is assigned to the assignee of the present patent application.

Referring still to FIG. 1, the stationary radio positioning system (RADPS) receiver 16 can be selected from the group consisting of: {a GPS receiver; a GLONASS receiver; a combined GPS/GLONASS receiver; a GALILEO receiver; a Global Navigational Satellite System (GNSS) receiver; and a pseudolite receiver}.

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency $f1=1575.42$ MHz (approximately nineteen centimeter carrier wavelength) and an L2 signal having a frequency $f2=1227.6$ MHz (approximately twenty-four centimeter carrier wavelength). These two frequencies are integral multiplies $f1=1,540\ f0$ and $f2=1,200\ f0$ of a base frequency $f0=1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes and accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9\ k/16)$ GHz and $f2=(1.246+7\ k/16)$ GHz, where $k=(1, 2, \ldots 24)$ is the channel or satellite number. These frequencies lie in two bands at 1.597-1.617 GHz (L1) and 1,240-1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

As disclosed in the European Commission "White Paper on European transport policy for 2010", the European Union will develop an independent satellite navigation system Galileo as a part of a global navigation satellite infrastructure (GNSS).

The GALILEO system is based on a constellation of 30 satellites and ground stations providing information concerning the positioning of users in many sectors such as transport (vehicle location, route searching, speed control, guidance systems, etc.), social services (e.g. aid for the disabled or elderly), the justice system and customs services (location of suspects, border controls), public works (geographical information systems), search and rescue systems, or leisure (direction-finding at sea or in the mountains, etc.).

GALILEO will offer several service levels, from open access to restricted access of various levels:

(A) An open, free basic service, mainly involving applications for the general public and services of general interest. This service is comparable to that provided by civil GPS, which is free of cost for these applications, but with improved quality and reliability.

(B) A commercial service facilitating the development of professional applications and offering enhanced performance compared with the basic service, particularly in terms of service guarantee.

(C) A "vital" service (Safety of Life Service) of a very high quality and integrity for safety-critical applications, such as aviation and shipping. A search and rescue service that will greatly improve existing relief and rescue services.

(D) A public regulated service (PRS), encrypted and resistant to jamming and interference, reserved principally for the public authorities responsible for civil protection, national security and law enforcement which demand a high level of continuity. It will enable secured applications to be developed in the European Union, and could prove in particular to be an important tool in improving the instruments used by the European Union to combat illegal exports and illegal immigration.

The real needs of future GALILEO users need to be identified before the characteristics of the package of services can be decided. Studies have already been carried out in various standardization institutes and international bodies, such as the International Civil Aviation Organization, the International Maritime Organization, etc.

The range of GALILEO services is designed to meet practical objectives and expectations, from improving the coverage of open-access services in urban environments (to cover 95% of urban districts compared with the 50% currently covered by GPS alone) which will benefit the 160 million private vehicles in Europe, or enabling the use of satellite navigation applications "indoors", in buildings and even in tunnels, or indeed mobile telephone services based on identifying the caller's position.

Reference to a Satellite Positioning System or RADPS herein refers to a Global Positioning System, to a Global Orbiting Navigation System, to GALILEO System, and to any other compatible Global Navigational Satellite System (GNSS) satellite-based system that provides information by which an observer's position and the time of observation can be determined, all of which meet the requirements of the present invention, and to a ground based radio positioning system such as a system comprising of one or more pseudolite transmitters.

After the RADPS receiver determines the coordinates of the i-th RADPS satellite by demodulating the transmitted ephemeris parameters, the RADPS receiver can obtain the solution of the set of the simultaneous equations for its unknown coordinates ($x_0$, $y_0$, $z_0$) and for unknown time bias error (cb). The RADPS receiver can also determine velocity of a moving platform.

A pseudolite comprises a ground based radio positioning system working in any radio frequency including but not limited to the GPS frequencies and the ISM (industrial scientific medical) unlicensed operation band, including 900 MHZ, 2.4 GHz, or 5.8 GHz bands ISM bands, or in a radio location band such as the (9.5-10) GHz band. Pseudolites can be used for enhancing the GPS by providing increased accuracy, integrity, and availability.

The complete description of the pseudolite transmitters in GPS band can be found in 'Global Positioning System: Theory and Applications; Volume II", edited by Bradford W. Parkinson and James J. Spilker Jr., and published in Volume 164 in "PROGRESS IN ASTRONAUTICS AND AERONAUTICS", by American Institute of Aeronautic and Astronautics, Inc., in 1966.

In ISM band, including 900 MHZ, 2.4 GHz, or 5.8 GHz bands, the user can own both ends of the ISM communication system. The ISM technologies are manufactured by Trimble Navigation Limited, Sunnyvale, Calif. Metricom, Los Gatos, Calif. and by Utilicom, Santa Barbara, Calif.

Pseudolites as radio positioning systems can be configured to operate in ISM band.

The following discussion is focused on a GPS receiver, though the same approach can be used for a GLONASS receiver, for a GPS/GLONASS combined receiver, GALILEO receiver, or any other RADPS receiver.

In one embodiment, the RADPS receiver 16 (of FIG. 1) can comprise a differential GPS receiver. In differential position determination, many of the errors in the RADPS signals that compromise the accuracy of absolute position determination are similar in magnitude for stations that are physically close. The effect of these errors on the accuracy of differential position determination is therefore substantially reduced by a process of partial error cancellation. Thus, the differential positioning method is far more accurate than the absolute positioning method, provided that the distances between these stations are substantially less than the distances from these stations to the satellites, which is the usual case. Differential positioning can be used to provide location coordinates and distances that are accurate to within a few centimeters in absolute terms. The differential GPS receiver can include: (a) a real time code differential GPS; (b) a post-processing differential GPS; (c) a real-time kinematic (RTK) differential GPS that includes a code and carrier RTK differential GPS receiver.

The differential GPS receiver can obtain the differential corrections from different sources.

Referring still to FIG. 1, in one embodiment of the present invention, the differential GPS receiver 16 can obtain the differential corrections from a Base Station 28.

The fixed Base Station (BS) placed at a known location determines the range and range-rate measurement errors in each received GPS signal and communicates these measurement errors as corrections to be applied by local users. The Base Station (BS) has its own imprecise clock with the clock bias $CB_{BASE}$. As a result, the local users are able to obtain more accurate navigation results relative to the Base Station location and the Base Station clock. With proper equipment, a relative accuracy of 5 meters should be possible at distances of a few hundred kilometers from the Base Station.

Referring still to FIG. 1, in another embodiment of the present invention, the differential GPS receiver 16 can be implemented by using a TRIMBLE Ag GPS-132 receiver that obtains the differential corrections from the U.S. Cost Guard service free in 300 kHz band broadcast by using the wireless communication device 18 and the wireless communication link 30. In this embodiment, the self-surveying laser transmitter 12 integrated with the differential GPS receiver 16 should be placed within (2-300) miles from the U.S. Cost Guard Base Station. The accuracy of this differential GPS method is about 50 cm.

Referring still to FIG. 1, in one embodiment of the present invention, the differential corrections can be obtained from the Wide Area Augmentation System (WAAS) by using the wireless communication device 18 and the wireless communication link 30. The WAAS system includes a network of Base Stations that uses satellites (initially geostationary satellites-GEOs) to broadcast GPS integrity and correction data to GPS users. The WAAS provides a ranging signal that augments the GPS, that is the WAAS ranging signal is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm. The WAAS provides the differential corrections free of charge to a WAAS-compatible user. The accuracy of this method is better than 1 meter.

Referring still to FIG. 1, in one embodiment of the present invention, the real time kinematic (RTK) differential GPS receiver 16 can be used to obtain the position locations with less than 2 cm accuracy. The RTK differential GPS receiver receives the differential corrections from the Base Station 28 placed in a known location within (10-50) km by using the wireless communication device 18 and the wireless communication link 30. For a high accuracy measurement, the number of whole cycle carrier phase shifts between a particular GPS satellite and the RTK GPS receiver is resolved because at the receiver every cycle will appear the same. Thus, the RTK GPS receiver solves in real time an "integer ambiguity" problem, that is the problem of determining the number of whole cycles of the carrier satellite signal between the GPS satellite being observed and the RTK GPS receiver. Indeed, the error in one carrier cycle L1 (or L2) can change the measurement result by 19 (or 24) centimeters, which is an unacceptable error for the centimeter-level accuracy measurements.

Referring still to FIG. 1, in one embodiment of the present invention, the differential corrections can be obtained by the RADPS receiver 16 from the Virtual Base Station (VBS) 28 by using the wireless communication device 18 and the wireless communication link 30.

Indeed, the Virtual Base Station (VBS) is configured to deliver a network-created correction data to a multiplicity of rovers via a concatenated communications link consisting of a single cellular connection, and a radio transmission or broadcasting system. The location of the radio transmitting system can be co-located with a GPS Base Station designated as the position of the local Virtual Reference Station. This GPS Base Station determines its position using GPS, and transmits its location to the VRS Base Station via a cellular link between the local GPS Base Station and the VRS Base Station. It enables the VRS Base Station to generate differential corrections as if such differential corrections were actually being generated at the real GPS Base Station location. These corrections can be delivered to the self-surveying laser transmitter 12 by using a wireless communication link 30 and wireless communication device 18.

An article "Long-Range RTK Positioning Using Virtual Reference Stations," by Ulrich Vollath, Alois Deking, Herbert Landau, and Christian Pagels, describing VRS in more details, is incorporated herein as a reference in its entirety, and can be accessed at the following URL: http://tr1.trimble.com/dscgi/ds.py/Get/File-93152/KIS2001-Paper-LongRange.pdf.

Referring still to FIG. 1, in one embodiment of the present invention, the wireless communication link 30 can be implemented by using a variety of different embodiments.

In general, the wireless communication link 30 (of FIG. 1) can be implemented by using a radiowave frequency band, an infrared frequency band, or a microwave frequency band. In one embodiment, the wireless communication link can include the ISM band, including 900 MHZ, 2.4 GHz, or 5.8 GHz bands, wherein the user can own both ends of the ISM communication system.

In one embodiment of the present invention, the wireless communication link 30 (of FIG. 1) can be implemented by using the Trimble SiteNet™ 900 private radio network. The Trimble SiteNet™ 900 private radio network is a rugged, multi-network, 900 MHz radio modem designed specifically for the construction and mining industries. It is used to establish robust, wireless data broadcast networks for real-time, high-precision GPS applications. This versatile Trimble radio operates in the frequency range of 902-928 MHz, broadcasting, repeating, and receiving real-time data used by Trimble GPS receivers. Under optimal conditions, the SiteNet 900 radio broadcasts data up to 10 km (6.2 miles) line-of-sight and coverage can be enhanced by using a network of multi-repeaters. Using the SiteNet 900 radio as a repeater, enables one to provide coverage in previously inaccessible or obstructed locations. The SiteNet 900 radio is so versatile, that one can easily change its operating mode to suit any network configuration. This reduces costs and maximizes uptime. Additionally, SiteNet 900 is license free in the U.S.A. and Canada, which makes it extremely portable. One can move it from project to project without licensing hassles and restrictions. The SiteNet 900 radio is designed to operate reliably in demanding RF environments where many other products and technologies cannot. Optimized for GPS with increased sensitivity and jamming immunity, the SiteNet 900 radio also has error correction, and a high-speed data rate, ensuring maximum performance. The SiteNet 900 radio is especially suited for use with Trimble's SiteVision™ GPS grade control system, and is ideal for all GPS machine control applications where reliability is important. The machine-rugged unit has been designed and built especially for harsh construction and mining environments. Fully sealed against dust, rain, splash, and spray, the SiteNet 900 radio remains reliable in all weather. The radio's ruggedness and reliability minimizes downtime, lowering ownership costs. Trimble's SiteNet 900 radio can be used with any Trimble GPS receiver, including: MS750, MS850, MS860, and 5700 receivers.

In one embodiment of the present invention, the wireless communication link 30 (of FIG. 1) can be implemented by using a 1.8 GHz band that supports the personal communications services (PCS). The PCS uses the international standard DCS-1800. Yet, in one more embodiment, the wireless communication link can include a real time circuit switched wireless communication link. For instance, the wireless communication link employing a real time circuit switched wireless communication link can include the Iridium satellite system produced by Motorola, Schaumburg, Ill.

In one additional embodiment, the wireless communication link can be implemented by using a system of Low Earth Orbiting Satellites (LEOS), a system of Medium Earth Orbiting Satellites (MEOS), or a system of Geostationary Earth Orbiting Satellites (GEOS) which can be used to store and to forward digital packet data. For instance, the LEOS systems in (20-30) GHz range are manufactured by Cellular Communications located in Redmond, Wash., and the LEOS systems in (1.6-2.5) GHz range are produced by Loral/Qualcomm located in San Diego, Calif.

The wireless communication link can include a cellular telephone communication means, a paging signal receiving means, wireless messaging services, wireless application services, a wireless WAN/LAN station, or an Earth-satellite-Earth communication module that uses at least one satellite to relay a radiowave signal. The wireless communication link can also include the cellular telephone communication means that can include an Advanced Mobile Phone System (AMPS) with a modem. The modem can comprise a DSP (digital signal processor) modem in 800 MHZ range, or a cellular digital packet data (CDPD) modem in 800 MHZ range. The cellular digital communication means includes a means of modulation of digital data over a radiolink using a time division multiple access (TDMA) system employing format IS-54, a code division multiple access (CDMA) system employing format IS-95, or a frequency division multiple access (FDMA). The TDMA system used in Europe is called groupe special mobile (GSM) in French.

For the purposes of the present invention, a cellular telephone communication means can be used to get a wireless access to the Internet in order, for example, to broadcast the real time coordinates of the self-surveying laser transmitter position on a special web-site.

Referring still to FIG. 1, the wireless communication device 18 can be implemented by using any of devices that can be configured to provide: {a cellular link; a radio link; a private radio band link; a SiteNet 900 private radio network link; a link to the wireless Internet; and a satellite wireless communication link}. A person skillful in the art can easily identify all these devices. Please, see the discussion above.

In one embodiment of the present invention, the wireless communication device 18 is configured to respond to specific requests from a mobile equipment (not shown) transmitted over the wireless communication link 30.

Referring still to FIG. 1, in one embodiment of the present invention, the laser transmitter 12 generates a dual-slope laser plane 14. In this embodiment, the RADPS receiver 16 includes a "vector" GPS receiver capable of determining the attitude of a dual-slope laser plane 14. A "vector" GPS receiver is disclosed in the U.S. Pat. No. 5,268,695 issued to Dentinger et al. This patent is incorporated herein in its entirety. The vector GPS receiver includes a system for time multiplexing a carrier signal received by two or more GPS antennas through a single hardware path, using a single receiver's oscillator in that hardware path as a reference to compare the phase from each antenna. One of the antennas is designated as a reference antenna and a carrier signal received by it is used to phase lock in a numerically controlled oscillator. The same carrier signal received by the other antennas is periodically compared in phase to the output of the numerically controlled oscillator. Each comparison results in a phase angle measurement for the respective antennas compared to the master antenna.

Referring still to FIG. 1, in one embodiment of the present invention, the laser transmitter 12 comprises a fan laser transmitter configured to generate at least one rotating fan-shaped laser beam 13 (and/or 15) that rotates continuously about a vertical axis at a uniform rate above a known stationary point in the plot of land. Trimble Navigation Ltd. manufactures the 3D Laser Station that generates at least one rotating fan-shaped laser beam 13 (and/or 15). The detailed description of such fan laser transmitter is given in the copending patent application Ser. No. 10/890,037 A-1500 "COMBINATION LASER SYSTEM AND GLOBAL NAVIGATION SATELLITE SYSTEM".

Referring still to FIG. 1, in one embodiment, the apparatus of the present invention 10 further comprises a distance measuring device 32 integrated with the laser transmitter 12 and integrated with the RADPS receiver 16. In this embodiment, the distance measuring device 32 is configured to measure the distance between the phase center of the stationary radio antenna (not shown) and a known point or reference plane 36 over which the self-surveying laser transmitter is positioned in order to determine the position coordinates of the laser transmitter in relation to the known point or reference plane.

The GlobalSpec Inc., located at 350 Jordan Rd, Troy, N.Y., 12180, manufactures a wide range of Electronic Distance Measurement (EDM) tools that can be used to implement the distance measurement device 32. More specifically, a special laser "gun" beam can be used to measure very precisely the time it takes for a laser beam to make the round-trip from the "gun" to the reflectors, and back. Using this time, the known speed that the laser travels (the speed of light), and correcting for air temperature and pressure, the distance can be determined to a precision of 1 part per million (i.e. 1 mm over a distance of 1 km).

Referring still to FIG. 1, in one embodiment, the apparatus of the present invention 10 further comprises a tilt angle measurement device 34 integrated with the laser transmitter 12 and integrated with the RADPS receiver 16. In this embodiment, the tilt measurement device 34 is configured to perform tilt coordinates measurements of the phase center of the stationary radio antenna (not shown) in relation to the known reference surface over which the self-surveying laser transmitter is positioned in order to determine the position coordinates of the laser transmitter in relation to the known reference surface.

In one embodiment, the tilt angle measurement device 34 further comprises an electronic tilt measurement device. The Precision Navigation, Inc., (PNI) based in Mountain View, Calif. manufactures TCM2 Electronic Compass Sensor Module. TCM2 is a high-performance, low-power electronic compass sensor that offers compass heading, pitch and roll through an electronic interface to host system. This high end system provides a robust heading reference system that can be easily integrated with a GPS navigational system. The Precision Navigation, Inc., (PNI) also manufactures a low end, low cost Vector-VR Head Positioning Sensor that provides a 3 DOF attitude sensor whose combination of tilt-performance, low-power, and low-cost makes it ideally suited for tilt-measurement applications.

Referring still to FIG. 1, in one embodiment, the apparatus of the present invention 10 further comprises an orientation measurement device (not shown) integrated with the laser transmitter 12 and integrated with the RADPS receiver 16. In this embodiment, the orientation measurement device is configured to perform orientation coordinate measurements of the phase center of the stationary radio antenna in relation to the known reference surface over which the self-surveying laser transmitter is positioned in order to determine an orientation of the laser transmitter in relation to the known reference surface.

In one embodiment of the present invention, the orientation can be measured by using a flux-gate compass.

A flux-gate compass incorporates an AC electromagnetic system that is disbalanced at the presence of a directed outside magnetic field. This disbalance induces voltages in the coils of the system. The amplitudes and phases of the voltages indicate the relative orientation of the system and field.

AlphaLab, Inc., located at 1280 South 300 West—Salt Lake City, Utah 84101, manufactures a flux gate magnetometer that can measure magnetic fields (technically "flux density") up to several times the strength of the Earth field. It has a resolution of 0.01 milligauss (1 nanotesla) and a range of +/−2000 milligauss (200 microteslas). This sensor approaches a proton precession magnetometer in temperature stability. However, at only 1 mm×0.2 mm, the active sensor area is much smaller than flux-gate magnetometer or proton sensors. This allows one to perform very precise magnetic measurements in small areas (such as thin films) or with high gradients by using this flux gate magnetometer.

In one embodiment of the present invention, FIG. 2 illustrates a self-surveying integrated laser and radio positioning guidance system (SSI_LARADPS) 50 including: a laser transmitter 66 generating a laser beam 72; a stationary radio positioning system (RADPS) receiver 68 integrated with the laser transmitter 66; a first wireless communication link 62; a stationary wireless communication device 64 configured to receive a set of differential corrections data by using the first wireless communication link 62; at least one mobile unit including a laser detector 80 and a mobile radio positioning system (RADPS) receiver 82; and at least one second wireless communication link 74 between SSI_LARADPS system and the mobile unit. The SSI_LARADPS system is analogues to the self-surveying laser transmitter system 10 (of FIG. 1) and its description given above is incorporated herein.

Thus, as was disclosed above, the stationary radio positioning system (RADPS) receiver 16 is configured to utilize the set of differential corrections data generated by the Base Station 60 by using a first wireless link 62 to obtain precise coordinate measurements of the laser transmitter. In this embodiment of the present invention, at least one second wireless communication link 74 is used to substantially continuously transmit to at least one mobile unit 76 the precise coordinate measurements of the laser transmitter 66 and the set of differential corrections obtained by the stationary RADPS receiver 68. As fully disclosed below, at least one mobile RADPS receiver 82 utilizes the differential corrections to obtain the precise coordinate measurements of the mobile unit 76 via the second wireless communication link 74.

The mobile RADPS receiver 82 is selected from the group consisting of: {a GPS receiver; a GLONASS receiver; a combined GPS/GLONASS receiver; a GALILEO receiver; a Global Navigational Satellite System (GNSS) receiver; and a pseudolite receiver}.

In one embodiment, the stationary RADPS 68 and the mobile RADPS 82 are selected to include the same satellite receiver configured to receive the same satellite signals.

EXAMPLE I

Both the mobile RADPS receiver 82 and the stationary RADPS receiver 68 are selected to include a GPS receiver configured to receive the satellite signals from the GPS satellite-vehicles SV1 52, SV2 54, SV 56, and SV 58.

The second wireless communication link 74 can be implemented by using a the same vehicles as the first wireless link 62, for instance, a cellular link; a radio link; a private radio band link; a SiteNet 900 private radio network link; a link to the wireless Internet; and a satellite wireless communication link. Please see full disclosure above.

EXAMPLE II

The first wireless communication link 62 is implemented by using a cellular phone link to connect to Virtual Base Station, whereas the second wireless communication link is implemented by using a SiteNet 900 private radio network link.

Referring still to FIG. 2, in one embodiment of the present invention, the laser transmitter 66 further comprises a plane laser transmitter configured to generate a reference laser beam 72 providing a high accuracy vertical coordinate.

Each mobile unit 76 is equipped with a laser detector 80 comprising a number of diodes. A laser receiver measures the signal strength on a number of diodes to determine the center of a laser beam. Topcon, Laser Systems, Inc., located in Pleasanton, Calif. manufactures machine mounted laser receivers: 9130 laser tracker and LS-B2 laser receiver. For reference, please see the '866 US Patent.

In one embodiment of the present invention, the mobile unit 76 detects the laser beam 72 by using a laser detector 80, and the mobile RADPS receiver 82 utilizes the differential corrections and the high accuracy Z vertical coordinate to obtain the precise coordinate measurements of the mobile unit 76. For reference, please see the '866 US Patent.

In another embodiment of the present invention, the laser transmitter 66 generates a rotating laser beam providing a high accuracy dual slope reference laser plane 72. In this embodiment of the present invention, the stationary radio positioning system (RADPS) receiver 68 further comprises a vector differential radio positioning system (VRADPS) receiver integrated with the laser transmitter 66. The vector differential radio positioning system (VRADPS) receiver was disclosed above.

Referring still to FIG. 2, in one embodiment of the present invention, at least one second wireless communication link 74 is used to transmit to at least one mobile unit 76 an elevation, a slope and angles of orientation of the laser plane at the location of the laser transmitter 66 and differential corrections obtained by the vector differential RADPS receiver 68. In this embodiment of the present invention, at least one mobile RADPS receiver 82 utilizes a set of data including a set of positional data obtained by the mobile RADPS receiver, the elevation, the slope and the angles of orientation of the laser plane at the laser transmitter location, and the differential corrections data in order to obtain the precise coordinate measurements of at least one mobile unit.

In one embodiment of the present invention, the laser transmitter 66 further comprises a fan laser transmitter configured to generate at least one rotating fan-shaped laser beam. In this embodiment of the present invention, at least one mobile RADPS receiver 82 utilizes a set of data including a set of positional data obtained by the mobile RADPS receiver, a set of positional data of the laser transmitter 66, and the differential corrections data in order to obtain the precise coordinate measurements of at least one mobile unit 76.

In one embodiment of the present invention, at least one second wireless communication link further comprises a modulation system (not shown) adapted to modulate the laser beam 72 with the differential correction data and with the laser beam data.

In one embodiment of the present invention, at least one mobile unit 76 further includes a mobile wireless communication device 78 configured to receive and transmit data; and a computer (not shown) configured to utilize the laser beam data and the differential correction data in order to precisely operate the mobile unit.

One more aspect of the present invention is directed to a method of self-surveying of any object, including a laser transmitter.

More specifically, in one embodiment, the method of the present invention comprises the following steps (not shown): (A) providing a stationary radio positioning system (RADPS) receiver integrated with the laser transmitter, whereas the stationary RADPS receiver includes a stationary radio antenna, and wherein the distance between a phase center of the stationary radio antenna and the laser transmitter is known and fixed; (B) providing a wireless communication device configured to receive a set of differential corrections data; and (C) obtaining precise coordinate measurements of the laser transmitter by using the stationary radio positioning system (RADPS) receiver configured to utilize the set of differential corrections data.

In one embodiment of the present invention, the step (A) (not shown) further comprises the step (A1) of selecting the stationary radio positioning system (RADPS) receiver from the group consisting of: {a GPS receiver; a GLONASS receiver; a combined GPS/GLONASS receiver; a GALILEO receiver; a Global Navigational Satellite System (GNSS) receiver; and a pseudolite receiver}.

In one embodiment of the present invention, the step (A) (not shown) further comprises the step (A2) of generating a reference laser beam providing a high accuracy vertical coordinate by using a plane laser transmitter. In another embodiment of the present invention, the step (A) further comprises the step (A3) of generating at least one rotating fan-shaped laser beam by using a fan laser transmitter.

In one embodiment of the present invention, the step (B) (not shown) further comprises the step (B1) of broadcasting the position coordinates of the laser transmitter by using the wireless communication device. In another embodiment of the present invention, the step (B) (not shown) further comprises the step (B2) of responding to specific requests from a mobile equipment by using the wireless communication device.

In one embodiment, the method of the present invention further comprises the step of providing a wireless communication link configured to connect the wireless communication device to a source of differential correction data. In one embodiment of the present invention, the optimum source of differential correction data is selected from the group consisting of: {a Base Station, an RTK Base Station; a Virtual Base Station (VBS); and a pseudolite transmitter}. In one embodiment of the present invention, the optimum wireless communication link is selected from the group consisting of: {a cellular link; a radio; a private radio band; a SiteNet 900 private radio network; a wireless Internet; and a satellite wireless communication link}.

Yet, one more aspect of the present invention is directed to a method of tracking a mobile unit utilizing a self-surveying integrated laser and radio positioning guidance system (SSI_LARADPS). The SSI_LARADPS system comprises: a laser transmitter; a stationary radio positioning system (RADPS) receiver integrated with the laser transmitter, the stationary RADPS receiver having a stationary radio antenna, wherein the distance between the phase center of the stationary antenna and the laser beam is known and fixed; a first wireless communication link; a stationary wireless communication device integrated with the laser transmitter; a mobile unit including a laser detector, a mobile radio positioning system (RADPS) receiver, and a mobile wireless communication device; and a second wireless communication link between the SSI_LARADPS system and the mobile unit.

In one embodiment, the method of the present invention comprises the following steps (not shown): (A) generating a laser beam using the laser transmitter; (B) receiving a set of differential corrections data by using the first wireless communication link and the stationary wireless communication device; (C) obtaining precise coordinate measurements of the laser transmitter by using the stationary radio positioning system (RADPS) receiver configured to utilize the set of differential corrections data; (D) using the stationary wireless communication device and the second wireless communication link to substantially continuously transmit to the mobile unit the precise coordinate measurements of the laser transmitter and the set of differential corrections obtained by the stationary RADPS receiver; (E) obtaining the precise coordinate measurements of the mobile unit by using the mobile RADPS receiver configured to utilize the differential corrections; and (F) sending back to the laser transmitter the precise coordinate measurements of the mobile by using the second wireless communication link and the mobile wireless communication device.

In one embodiment of the present invention, the step (A) of generating the laser beam using the laser transmitter further comprises the step (A1) (not shown) of generating a reference laser beam providing a high accuracy vertical coordinate by using a plane laser transmitter. In another embodiment of the present invention, the step (A) of generating the laser beam using the laser transmitter further comprises the step (A2) (not shown) of generating a rotating laser beam, wherein the rotating laser beam provides a high accuracy dual slope reference laser plane.

In one embodiment of the present invention, the step (A) of generating the laser beam using the laser transmitter further comprises the step (A3) (not shown) of generating at least one rotating fan-shaped laser beam by using a fan laser transmitter.

In one embodiment, wherein the SSI_LARADPS system further comprises a display (not shown), the method of the present invention further comprises the step (G) of displaying the precise coordinate measurements of the mobile unit on the display.

In one embodiment, the method of the present invention further comprises the following steps (not shown): (H) substantially continuously updating the precise coordinate measurements of the mobile unit; (I) sending back to the laser transmitter the updated coordinate measurements of the mobile unit by using the second wireless communication link and the mobile wireless communication device; and (K) displaying the updated coordinate measurements of the mobile unit on the display.

One additional aspect of the present invention is directed to a method of tracking a plurality of mobile units utilizing a self-surveying integrated laser and radio positioning guidance system (SSI_LARADPS).

In one embodiment, the method of the present invention comprises the following steps (not shown): (A) generating a laser beam using the laser transmitter; (B) receiving a set of differential corrections data by using the first wireless communication link and the stationary wireless communication device; (C) obtaining precise coordinate measurements of the laser transmitter by using the stationary radio positioning system (RADPS) receiver configured to utilize the set of differential corrections data; (D) using the stationary wireless communication device and at least one second wireless communication link to substantially continuously transmit to at least one mobile unit the precise coordinate measurements of the laser transmitter and the set of differential corrections obtained by the stationary RADPS receiver; (E) obtaining the precise coordinate measurements of at least one mobile unit by using the mobile RADPS receiver configured to utilize the differential corrections; (F) sending back to the laser transmitter the precise coordinate measurements of at least one mobile by using at least one second wireless communication link and at least one mobile wireless communication device; and (G) repeating the steps (D-F) for at least one next mobile unit.

In one embodiment, wherein the SSI_LARADPS system further comprises a display (not shown), the method of the present invention further comprises the step (H) (not shown) of displaying the precise coordinate measurements of at least one mobile unit on the display.

In one embodiment, the method of the present invention further comprises the following steps (not shown): (I) substantially continuously updating the precise coordinate measurements of at least one mobile unit; (K) sending back to the laser transmitter the updated coordinate measurements of at least one mobile unit by using at least one second wireless communication link and at least one mobile wireless communication device; and (L) displaying the updated coordinate measurements of at least one mobile unit on the display.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of tracking a plurality of mobile units utilizing a self-surveying integrated laser and radio positioning guidance system (SSI_LARADPS); said SSI_LARADPS system comprising: a laser transmitter; a stationary radio positioning system (RADPS) receiver integrated with said laser transmitter, said stationary RADPS receiver having a stationary radio antenna, wherein the distance between the phase center of said stationary antenna and said laser beam is known and fixed; a first wireless communication link; a stationary wireless communication device integrated with said laser transmitter; each said mobile unit including a laser detector, a mobile radio positioning system (RADPS) receiver, and a mobile wireless communication device; and a second wireless communication link between said SSI_LARADPS system and at least one said mobile unit; said method comprising the steps of:

(A) generating a laser beam using said laser transmitter;

(B) receiving a set of differential corrections data by using said first wireless communication link and said stationary wireless communication device;

(C) obtaining precise coordinate measurements of said laser transmitter by using said stationary radio positioning system (RADPS) receiver; wherein said stationary radio positioning system (RADPS) is configured to obtain the precise coordinate measurements of said laser transmitter by using a plurality of radio ranging signals from plurality of radio sources selected from the group consisting of: {GPS; GLONASS; GALILEO; Global Navigational Satellite System (GNSS); at least one pseudolite transmitter} and by using said set of differential corrections data;

(D) using said stationary wireless communication device and at least one said second wireless communication link to substantially continuously transmit to at least one said mobile unit said precise coordinate measurements of said laser transmitter and said set of differential corrections obtained by said stationary RADPS receiver;

(E) obtaining the precise coordinate measurements of said at least one mobile unit by using said mobile RADPS receiver configured to utilize said differential corrections;

(F) sending back to said laser transmitter said precise coordinate measurements of said at least one mobile by using at least one said second wireless communication link and at least one said mobile wireless communication device;

and (G) repeating said steps (D-F) for each said mobile unit.

2. The method of claim 1, said SSI_LARADPS system further comprising a display, said method further comprising the step of:

(H) displaying said precise coordinate measurements of each said mobile unit on said display.

3. The method of claim 1 further comprising the steps of:

(I) substantially continuously updating the precise coordinate measurements of each said mobile unit;

(K) sending back to said laser transmitter said updated coordinate measurements of each said mobile unit by using at least one said second wireless communication link and at least one said mobile wireless communication device;

and (L) displaying said updated coordinate measurements of each said mobile unit on said display.

* * * * *